(12) United States Patent
Ramanujan

(10) Patent No.: US 7,145,520 B2
(45) Date of Patent: Dec. 5, 2006

(54) DISPLAY APPARATUS BOX USING A SPATIAL LIGHT MODULATOR

(75) Inventor: Sujatha Ramanujan, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 676 days.

(21) Appl. No.: 10/036,646

(22) Filed: Nov. 7, 2001

(65) Prior Publication Data

US 2003/0085857 A1    May 8, 2003

(51) Int. Cl.
    *G09G 3/00*    (2006.01)
(52) U.S. Cl. .................. 345/32; 345/690; 345/698
(58) Field of Classification Search .......... 345/1.1–1.2, 345/7, 9–14, 55, 82, 108, 690–699, 204–207, 345/501, 530, 20, 32
    See application file for complete search history.

(56) References Cited

U.S. PATENT DOCUMENTS

| | | | | |
|---|---|---|---|---|
| 4,876,608 A | * | 10/1989 | Eaton ........................ | 358/443 |
| 4,935,820 A | * | 6/1990 | Patel et al. ................ | 358/302 |
| 5,061,049 A | | 10/1991 | Hornbeck | |
| 5,325,137 A | | 6/1994 | Konno et al. | |
| 5,327,229 A | * | 7/1994 | Konno et al. ............... | 348/742 |
| 5,585,691 A | * | 12/1996 | Washburn .................. | 313/452 |
| 5,734,498 A | * | 3/1998 | Krasieva et al. ............ | 359/387 |
| 5,743,610 A | | 4/1998 | Yajima et al. | |
| 5,808,800 A | | 9/1998 | Handschy et al. | |
| 5,812,303 A | * | 9/1998 | Hewlett et al. ............. | 359/298 |
| 5,815,303 A | * | 9/1998 | Berlin ........................ | 359/214 |
| 5,903,323 A | | 5/1999 | Ernstoff et al. | |
| 6,246,450 B1 | | 6/2001 | Inbar | |
| 6,278,540 B1 | * | 8/2001 | Wang ........................ | 359/245 |
| 6,388,649 B1 | * | 5/2002 | Tanaka et al. ............... | 345/89 |
| 6,388,661 B1 | * | 5/2002 | Richards ..................... | 345/204 |
| 6,654,156 B1 | | 11/2003 | Crossland et al. | |
| 6,771,325 B1 | * | 8/2004 | Dewald et al. ............. | 348/743 |
| 6,828,961 B1 | * | 12/2004 | Elliott et al. ................ | 345/213 |
| 6,870,544 B1 | * | 3/2005 | Blanchard et al. .......... | 345/589 |
| 2002/0021832 A1 | * | 2/2002 | Dawson ..................... | 382/154 |
| 2003/0039019 A1 | * | 2/2003 | Large et al. ................ | 359/256 |

* cited by examiner

*Primary Examiner*—Richard Hjerpe
*Assistant Examiner*—Leonid Shapiro
(74) *Attorney, Agent, or Firm*—Nelson Adrian Blish

(57) ABSTRACT

A digital display apparatus (10) using a spatial light modulator (30) projects a monochrome or multicolor image onto a display surface (40) for diagnostic imaging applications. The image can be displayed on a direct-view display surface (40) or, with the image mirrored, on a display screen. A single spatial light modulator (30) could serve for all component colors, with multiplexed color channels. Alternately, additional spatial light modulators (30) could be used, either to obtain higher image resolution or to improve speed and performance. An optional variable filter (28) could be used to selectively control the relative transmission level of color components for successive color components.

18 Claims, 7 Drawing Sheets

DISPLAY APPARATUS BOX USING A SPATIAL LIGHT MODULATOR

FIELD OF THE INVENTION

This invention generally relates to imaging apparatus using spatial light modulators and more particularly relates to an apparatus and method using a spatial light modulator for displaying, in monochromatic or full-color form, a high-quality diagnostic image.

BACKGROUND OF THE INVENTION

Two-dimensional spatial light modulators are widely used in a range of imaging applications for projection of color images. Because they form a complete, two-dimensional image at one time without requiring mechanical movement, spatial light modulators offer a number of advantages over other types of imaging devices, such as scanning lasers, for example.

A spatial light modulator can be considered essentially as a one- or two-dimensional array of light-valve elements, each element corresponding to an image pixel. Each array element is separately addressable and digitally controlled to modulate light, in cooperation with its support optics, by transmitting, blocking transmission, or reflection of incident light from a light source.

There are two salient types of spatial light modulators that are employed for forming images in projection apparatus. The first type, the liquid crystal device (LCD), modulates an incident beam by selectively altering the polarization of light for each pixel. An LCD may be transmissive, operating by selectively transmitting the incident beam through individual array elements, or reflective, selectively changing the polarization of a reflected beam at individual array elements. The second basic type of spatial light modulator currently in use is the digital micromirror device (DMD), disclosed in U.S. Pat. No. 5,061,049. The DMD modulates using time-phased reflection at each individual pixel site.

Projection apparatus using spatial light modulators include those disclosed in U.S. Pat. Nos. 5,325,137 and 5,743,610. A device of this type used for miniaturized image display, such as mounted within a helmet or supported by eyewear, is disclosed in U.S. Pat. No. 5,808,800.

Taking advantage of continuing development of spatial light modulators and of their support optical and electronic components, designers have been able to enhance the performance and reduce the cost of color projection apparatus. However, it can be readily appreciated that there is still room for improvement. It can also be readily acknowledged that improvements in performance and lower cost can help to make some of the potential benefits of digital imaging available where conventional optical imaging methods are primarily used.

One area where digital imaging affords great potential advantages is in diagnostic imaging, particularly for X-rays. Conventionally, X-rays and other types of diagnostic images are produced primarily on film. This is true even though many types of diagnostic images, such as X-rays, are initially obtained as scanned digital data. While some electronic display devices have been employed for X-ray viewing, these devices have, by and large, proved to be bulky and costly and have not provided the level of image quality necessary for wide acceptance.

A subtler problem also affects acceptance by medical professionals of electronically displayed X-rays as digital images. That is, the conventional X-ray is monochromatic, with images represented in varying tone or density values of a single hue. For example, grayscale images appear to be essentially monochromatic, using tone values from white to black. Some doctors and technicians, well acquainted with the color hue and tone quality provided by conventional X-ray development, are understandably reluctant to adapt to digital representation. Earlier displays of digital diagnostic images did not have the ability to emulate the familiar color hues and tones of conventional film-based images, and thus did not enjoy the necessary level of confidence in their accuracy, repeatability, and reliability.

The emphasis in design of digital projection systems, meanwhile, has consistently been directed to color projection. Monochrome display projection in general, such as grayscale projection, excites very little interest for electronic projection systems designers. Thus, while digital projector development has moved toward improved representation of color, the needs of diagnostic imaging remain fixed in a monochrome mode. Moreover, development apparatus for sensitized media used in diagnostic imaging, such as X-ray film, are known to provide different color hues, with typical base colors ranging from sepia to dark blue, depending on the system or lab processing method used to develop the media.

Spatial light modulators have been used in digital light box applications, as is disclosed in U.S. Pat. No. 6,246,450. However, in the apparatus described in U.S. Pat. No. 6,246,450, the light modulator is used only as a mask for controlling the areas of light provided for light box illumination, rather than directly as an image-forming source.

It is instructive to note that LCDs exhibit wavelength dependencies, by which modulation characteristics vary somewhat, depending on the wavelength of the incident beam. Thus, LCDs are not well-suited to white-light illumination, but provide a tint which is often considered to be objectionable. In practice, a projector employing LCDs either uses a separate color channel with a separate LCD for each color light component, typically red, green, and blue (RGB) or time-shares a single LCD, multiplexing each component light source. For each color channel, different LCD bias voltages may be used or different support filters or other optical components provided in order to compensate for wavelength dependencies. By comparison, the DMD is less sensitive to wavelength.

The need for handling separate colors, then, complicates the task of providing monochrome images, particularly where user preferences for particular color hues would be a factor, such as with conventional X-rays. Thus, it can be appreciated that there is a long-felt need for a projection system for diagnostic imaging that provides a suitable monochrome tone scale response for which the hue can be adjusted to observer preference and that provides a display with sufficient performance, reliability, and accuracy, at a cost that competes with that of existing X-ray film development and display systems.

SUMMARY OF THE INVENTION

It is an object of the present invention to provide a display apparatus for projection of an image-carrying beam from digital data onto a display surface, the apparatus comprising:
 (a) a light source for providing a beam of multicolor light;
 (b) a variable filter disposed to provide a periodic attenuation of a range of component wavelengths of the beam of multicolor light in order to provide a variably tinted beam;

(c) a spatial light modulator for modulating the variably tinted beam according to the digital data to provide the image-carrying beam; and (d) a control logic processor for modulating a bias voltage to the spatial light modulator, the bias voltage modulation synchronous with the periodic attenuation of the variable filter.

According to another aspect of the present invention, it is an object to provide a display apparatus for direct-view display of an image from digital data comprising:

(a) a light source for providing a beam of multicolor light;

(b) a spatial light modulator for modulating the beam according to the digital data to provide an image-carrying beam; and (c) a diffusive display surface for display of the image-carrying beam.

It is a feature of the present invention that it employs a spatial light modulator to provide an image from digital data. With necessary changes to light source, output optics, and image processing functions, an apparatus allows the image to be viewed directly, as in a conventional light-box apparatus, or to be projected onto a display surface.

It is an advantage of the present invention that it provides an inexpensive alternative to the methods and cost of using conventional light-box apparatus, eliminating the need for the intermediate step of developing the diagnostic image onto a film medium before it can be displayed. There is no need for transformation of the digital data to an analog format using the method and apparatus of the present invention.

It is a further advantage of the present invention that it provides a low-cost solution for digital image display.

It is yet a further advantage of the present invention that it provides an apparatus requiring only a small footprint when compared against conventional digital image display devices.

It is yet a further advantage of the present invention that it allows adjustment, to suit observer preferences, of the monochrome hue for which the grayscale is applied.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
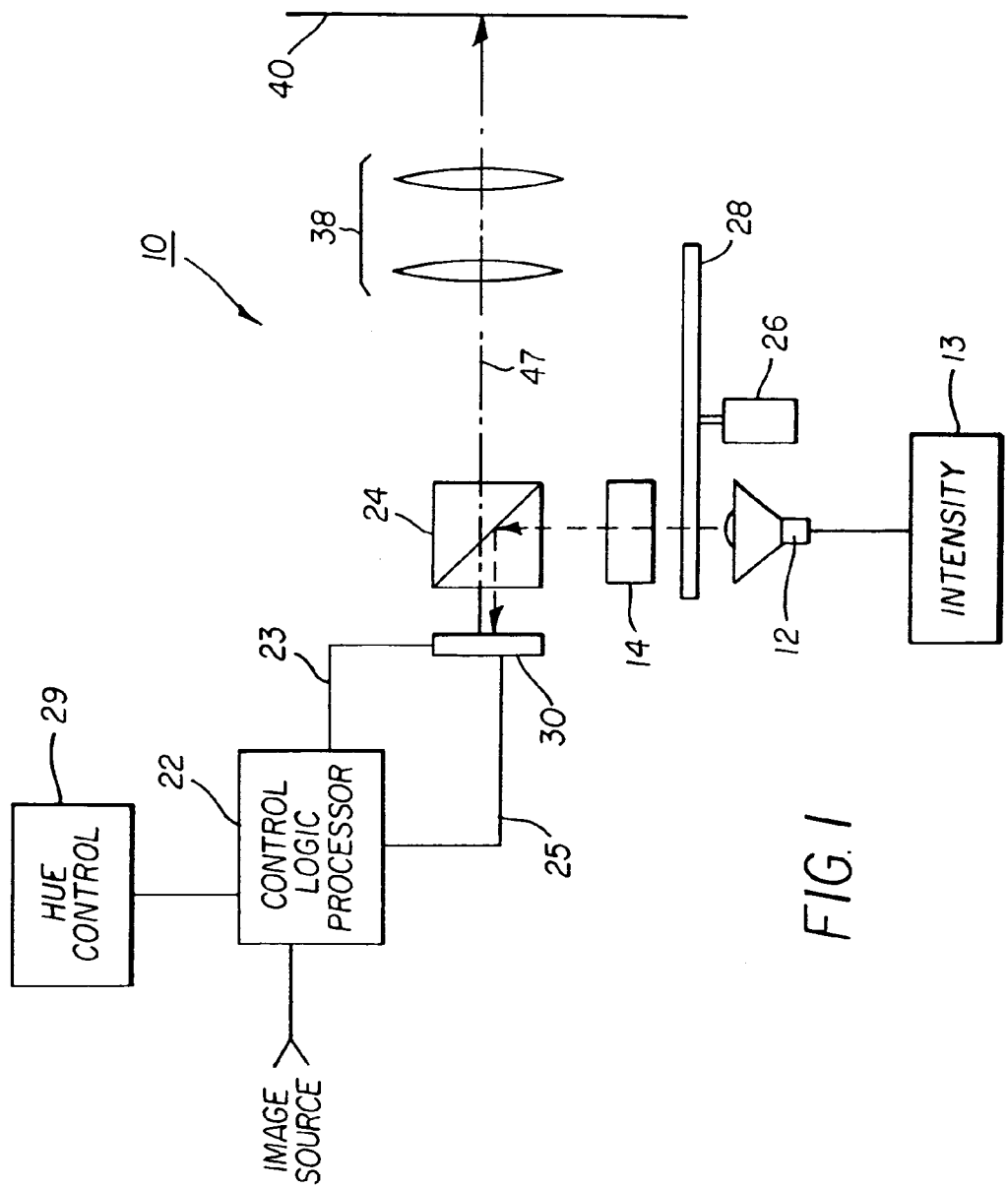
FIG. 1 is a schematic block diagram showing a preferred embodiment of the present invention, a digital projection system with a white light source using a single spatial light modulator.

Referring to FIG. 1, there is shown a digital display apparatus 10 for projecting a diagnostic digital image onto a display surface 40. A light source 12 provides a source beam that comprises more than one light wavelength. In a preferred embodiment, light source 12 is a lamp that provides white light. However, from a more general perspective, light source 12 could be any suitable multicolor light source. The source light beam is modulated by a spatial light modulator 30 according to digital data provided from an image source and processed by a control logic processor 22. The digital data is typically a file that comprises scanned data from a diagnostic imaging system, such as an X-ray system.

In the optics path shown in FIG. 1, uniformizing optics 14 improve the uniformity of the source light beam and may also condition the polarization of the source light beam. The uniformized light is then directed to a beamsplitter 24. Light of suitable polarity is thereby reflected from beamsplitter 24 and directed toward spatial light modulator 30. Spatial light modulator 30 received and image data signal 23 from control logic processor forms an image-bearing beam 47, which is transmitted through beamsplitter 24 and is directed to display surface 40 by projection optics 38.

The configuration of display surface 40 depends upon how digital display apparatus 10 is embodied. As a digital light-box, digital display apparatus 10 provides the image for direct viewing, for which display surface 40 is a diffusive surface. Alternately, where digital display apparatus 10 is used as a projector, display surface 40 could be a conventional display screen. Display surface 40 could be diffusive, transmissive, or even emissive and could be a curved or flat surface. A screen that provides image retention could also be used as one type of display surface 40. Projection optics 38 would be configured appropriately for the direct-view or projector embodiment.

For diagnostic imaging applications, digital display apparatus 10 provides an image on display surface 40. In a preferred embodiment, a monochrome image is displayed. A monochrome image employs a base color hue, typically dark blue, black, or brown and provides an image using a tone scale or densities within that hue. For example, a true grayscale image, which is the most familiar type of monochrome image, uses black as its base color hue and represents an image using a gray tone scale. It must be emphasized that, in a display device, even though the hue is a single color, synthesis of the color hue itself typically requires some combination of component colors, typically red, green, and blue (RGB), using color representation techniques well known in the image display art. That is, in the typical case, the monochrome hue is not itself a "pure" color when represented on a display, but is represented using a combination of red, green, and blue light in varying amounts. The apparatus and method of the present invention allow a monochrome hue to be adjusted to suit observer preference. Using the present invention, then, a diagnostic image can be viewed as a true grayscale image, with a base hue that is black, or as an image having a corresponding tone scale with a base hue that is some other sufficiently dark color.

It must also be noted that widespread use of the casual term "grayscale" causes some confusion. From a data processing perspective, the term "grayscale" is applied generally to image data that represents a monochrome image having a variable tone scale, whether or not the base hue is black. As image data, grayscale data can be considered to have no color content information itself; instead, grayscale data contains tone scale values only. From a display perspective, then, grayscale image data is suited for display in a monochrome imaging apparatus, without reference to a specific monochrome hue.

It must also be noted that, while digital display apparatus 10 of the present invention is optimized to provide a monochrome image, a multicolor image could alternately be provided, using two or more colors, with the components of digital display apparatus 10 suitably adapted. As was noted above, viewer preference and convention may dictate that only a single output color hue be provided; by design, digital display apparatus 10 is capable of providing an image comprising a single hue with varying tone scale values or an image having two or more colors as needed.

The data provided to control logic processor 22 from the image source is typically, then, grayscale image data intended for monochromatic display. Where spatial light modulator 30 is a DMD-type device, white light from light source 12 is conditioned at uniformizer 14 and used directly by spatial light modulator 30 to provide a monochrome image. However, where spatial light modulator 30 is an LCD-type device, modulation response to incident light can be highly wavelength-specific. White-light performance simply may not be satisfactory. Instead, it is typically preferred to provide separate handling for red, green, and blue (RGB) components of white light, as is familiar to those skilled in the image projection arts. Thus, for example, the optimal bias voltage 25 applied to spatial light modulator 30 when modulating red light can differ from the preferred bias voltage when modulating green light. By changing bias voltage and lookup table settings in the proper sequence, the same basic optical components, as shown in FIG. 1, can be used to handle successive color light beams in a multiplexing fashion, thereby creating either monochromatic or full color projection.

It is instructive to note that diagnostic imaging applications predominantly display still images, such as X-rays, or images in which motion occurs relatively slowly, as in many ultrasound applications. For this reason, it may be practical to generate an image from a single spatial light modulator 30 by a multiplexing arrangement using two or more color light beams, since component response time requirements are not highly demanding.

Referring again to FIG. 1, there are shown components for one alternative method of light path multiplexing for RGB colors, as used in a preferred embodiment. For this purpose, an optional variable filter 28 is provided for conditioning the source light beam. A motor 26 rotates variable filter 28 in the path of the source light beam, conditioning the beam to provide different relative intensities of RGB source light component colors at suitable times. In synchronization with the rotation sequence for variable filter 28, control logic processor 22 successively changes the voltage bias level provided to spatial light modulator 30, thereby optimizing the response of spatial light modulator 30 to a narrow range of wavelengths. This coordinated sequencing, executed at sufficient speed, allows use of a single channel for successively projecting each of the three RGB component colors in order to form a composite-color image.

Figure 2:
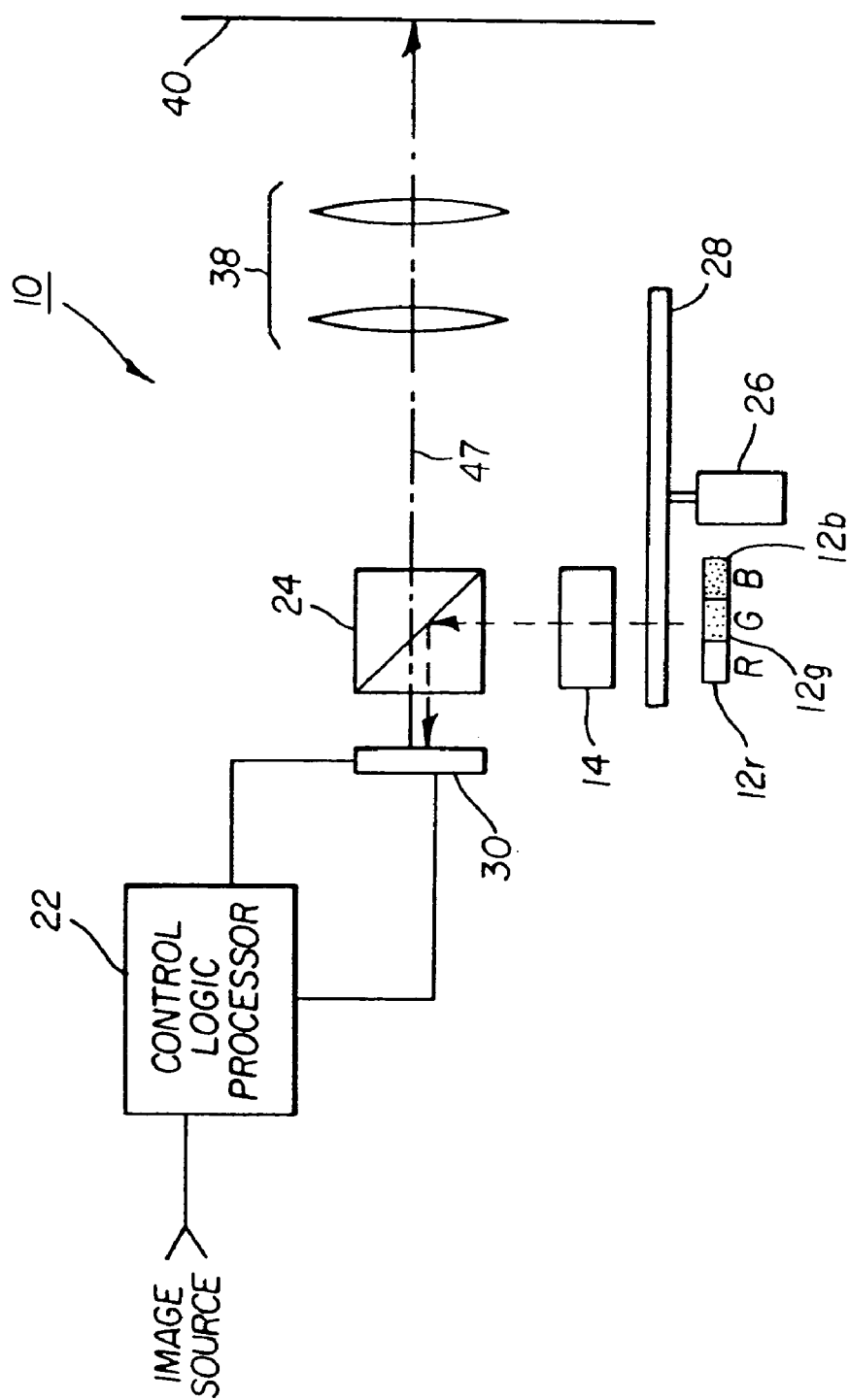
FIG. 2 is a schematic block diagram showing an alternate embodiment of the present invention, a digital projection system using an alternate light source with a single spatial light modulator.

Referring to FIG. 2, there is shown an alternative arrangement of components for providing the source light beam for digital display apparatus 10. Here, separate red, green, and blue light sources 12r, 12g, and 12b are provided. With this arrangement, flexible control of light intensity and synchronization is possible. It may be advantageous for some imaging applications, for example, to have light sources 12r, 12g, and 12b all active at one time, optionally using variable filter 28. It may be advantageous to modulate each individual light source 12r, 12g, or 12b individually, such as varying intensity or timing, synchronous with control of voltage bias setting by control logic processor 22; in such a case, variable filter 28 would not be needed.

Light sources 12 in FIG. 1 and 12r, 12g, and 12b in FIG. 2 can be any of a number of suitable types, depending largely on brightness, cost, and use criteria. White light sources can include any of a number of types of lamps, such as halogen, or xenon arc lamps, for example. LEDs can be any of a number of suitable LED types, selected for suitable brightness and wavelength characteristics. Other types of light source 12 could include lasers. Light sources with radiation outside the visible spectrum could optionally be used, largely depending on imaging response characteristics of display surface 40.

Uniformizing optics 14 may comprise a suitable configuration of lenslets, an integrating bar, or other components for conditioning the source light beam to provide uniform illumination for spatial light modulator 30.

Timing Considerations for Color Multiplexing

Figure 3:
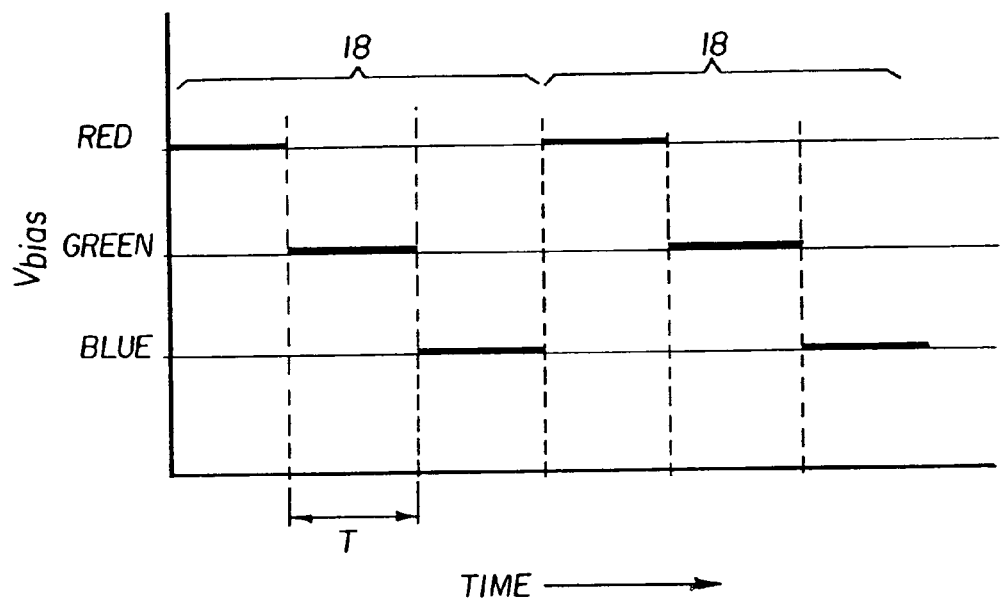
FIG. 3 shows a timing relationship for different backplane bias voltage levels for a spatial light modulator.

Referring to FIG. 3, there is shown a sample timing diagram of the changing bias voltage $V_{bias}$ for color multiplexing of spatial light modulator 30 when using the optics arrangement of FIGS. 1 or 2. In each cycle 18, the $V_{bias}$ level is set to provide the best contrast for successive RGB illumination. Each color is modulated by spatial light modulator 30 for a period T. Period T must be short enough so that the eye of the observer does not detect the individual colors, but instead integrates the succession of color images to obtain a monochrome grayscale image or suitable multicolor image. It is instructive to note that FIG. 3 is idealized; the actual $V_{bias}$ signal could be varied over a range of levels within overall period T, for example.

Figure 4:
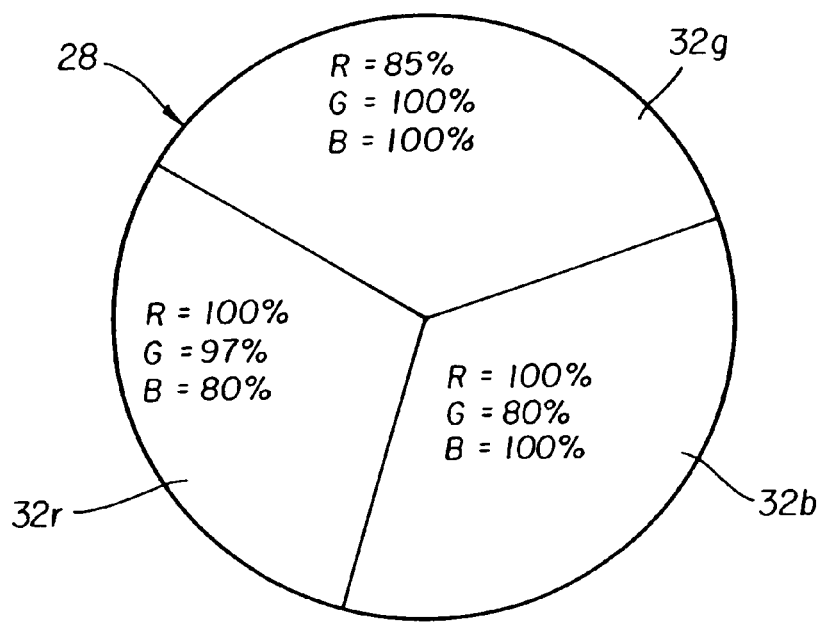
FIG. 4 shows a variable filter wheel of the present invention.

Referring to FIG. 4, there is shown a plane view of variable filter 28, which operates as a hue compensation filter, with its arrangement of filter components: a red transmissive filter portion 32r, a green/blue transmissive filter portion 32g, and a blue transmissive filter portion 32b. When rotated (counterclockwise with respect to the view shown in FIG. 4), variable filter 28 successively presents a filtering sequence corresponding to the timing sequence for optimizing contrast used in FIG. 3.

The timing sequence of FIG. 3 and rotation of variable filter 28 work together as follows: During the red segment of cycle 18, red light is modulated by spatial light modulator 30. The preferred $V_{bias}$ level for optimum contrast under red light illumination is provided to spatial light modulator 30. In order to correct for hue variation during red light illumination, green/blue transmissive filter portion 32g is used to attenuate the incident red light from light source 12. Similarly, during the next green segment of cycle 18, the preferred $V_{bias}$ level for optimum contrast under green light illumination is provided to spatial light modulator 30. In order to correct for hue variation during green light illumination, blue transmissive filter portion 32b is used to attenuate the incident green light from light source 12. Likewise, during the blue segment of cycle 18, red transmissive filter portion 32r attenuates the incident light from light source 12. In this way, the color content of the source light beam that is delivered to spatial light modulator 30 varies with the rotation of variable filter 28, synchronous with the $V_{bias}$ level provided by control logic processor 22, thereby optimizing the performance of spatial light modulator 30 for each component color. It is important to observe that values shown in FIG. 4 are exemplary only; actual values must be empirically determined for digital display apparatus 10.

It is instructive to note that FIGS. 3 and 4 show idealized timing relationships and filter arrangements of a preferred embodiment, respectively. In practice, it may be preferable to vary the $V_{bias}$ level during any period of cycle 18. Similarly, it may be preferable to have gradations of color attenuation in variable filter 28 so that, for example, the transitions between red transmissive filter portion 32r, green/blue transmissive filter portion 32g, and blue transmissive filter portion 32b are less distinct. However it is embodied in practice, the coordination of modulation of source light color content with modulation of applied $V_{bias}$ level falls within the scope of the present invention.

The image data itself may be identical during each period of cycle 18 (FIG. 3) or may change between cycles.

Enhanced Spatial Resolution

Figure 5:
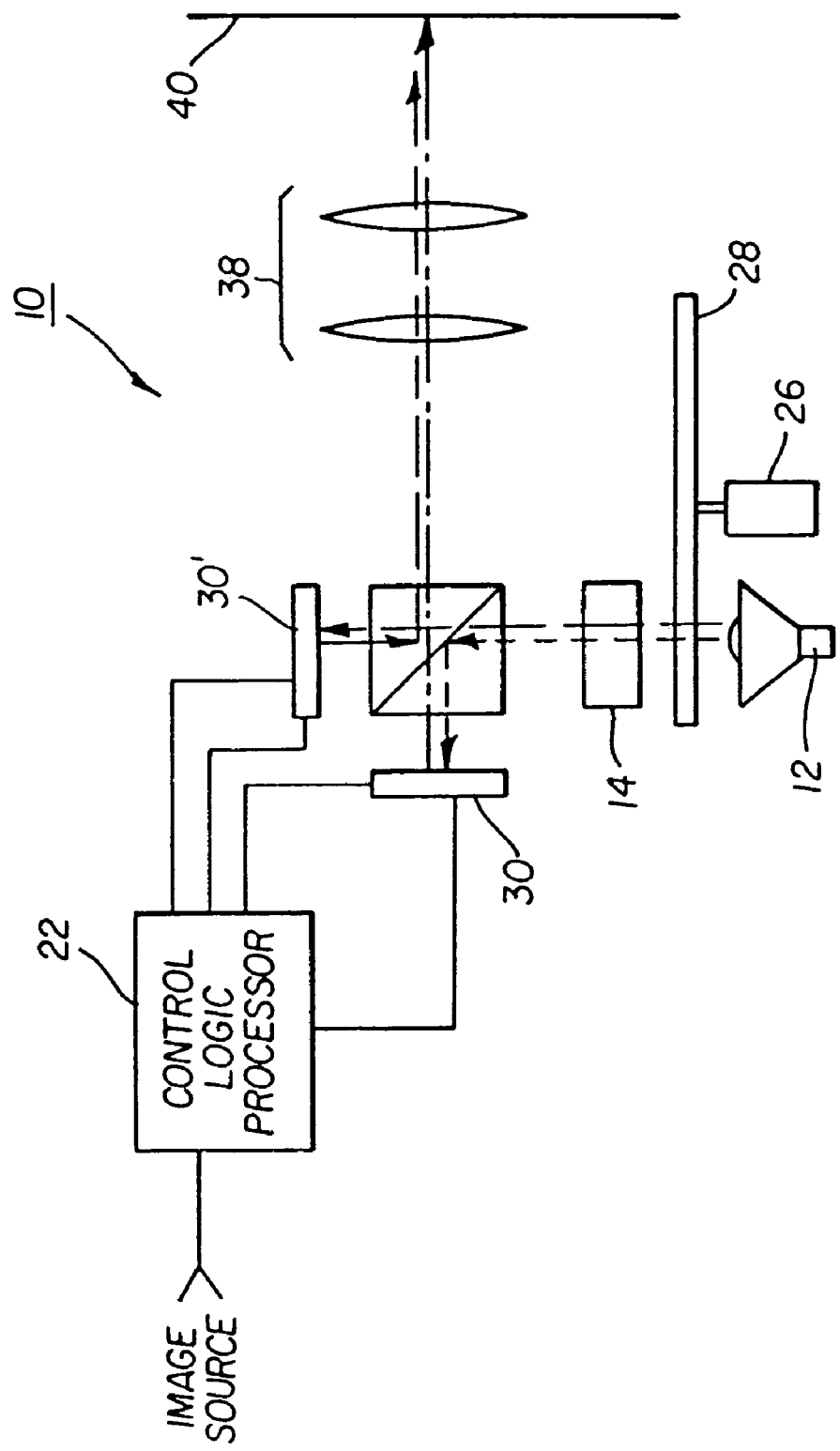
FIG. 5 shows an alternate embodiment of the present invention, in which an apparatus uses multiple spatial light modulators to achieve higher resolution.

For some types of diagnostic imaging, it may also be advantageous to enhance image resolution available from digital display apparatus 10. Referring to FIG. 5, digital display apparatus 10 is shown with modifications for providing additional resolution. As with embodiments shown in FIGS. 1 and 2, a single color channel is active at any one time. In the configuration of FIG. 5, an additional spatial light modulator 30' is provided to supplement the image-forming activity of spatial light modulator 30.

Figure 6:
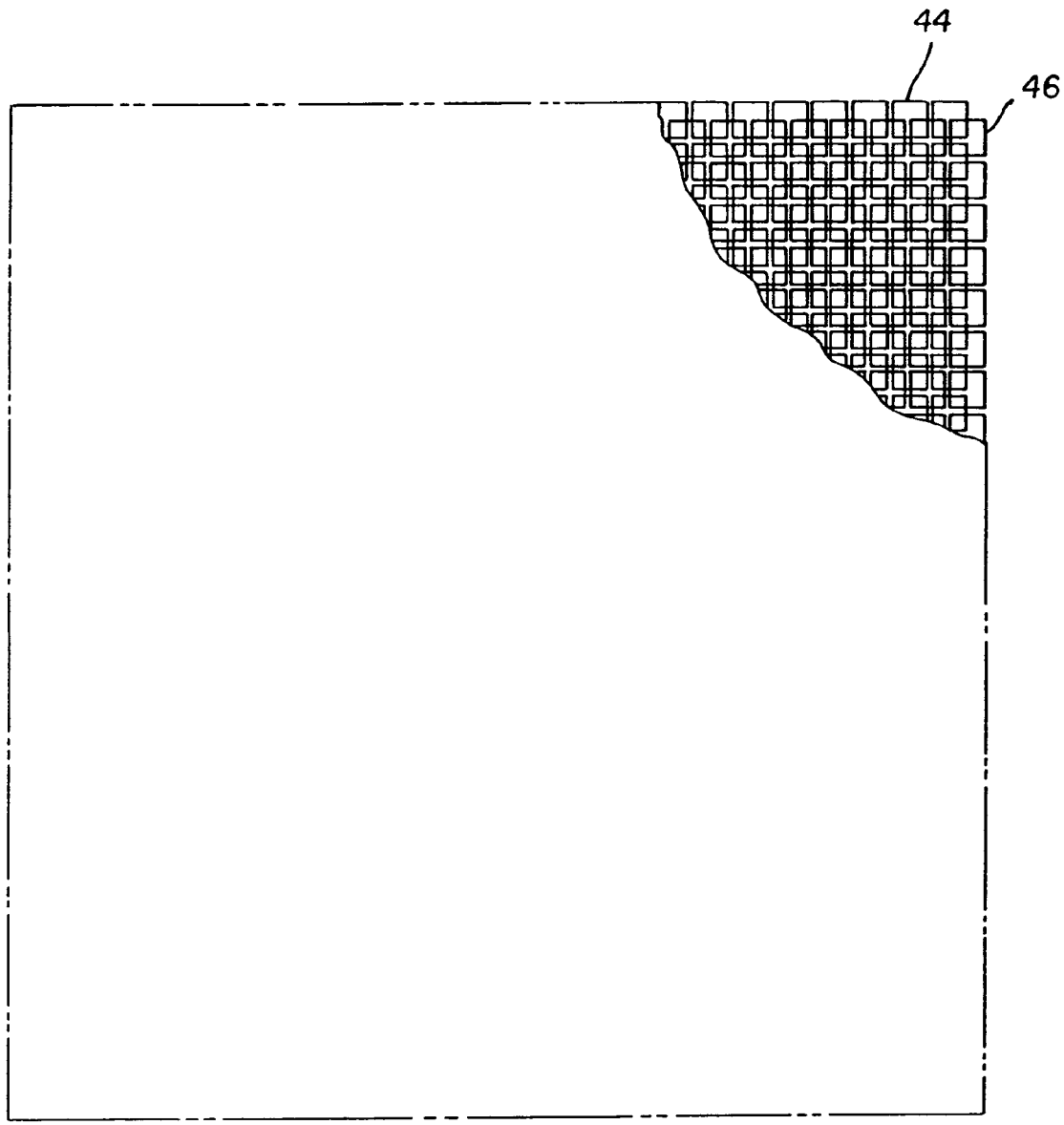
FIG. 6 is a plane view showing the relative spatial relationship of spatial light modulator pixel arrays for achieving higher resolution with the multiple-device arrangement shown in FIG. 5.

Referring to FIG. 6, there is shown how, by slightly shifting the pixel array of additional spatial light modulator 30' relative to spatial light modulator 30, the superimposed pixel pattern yields higher resolution. Spatial light modulator 30 provides output pixels in a first pixel array position 44. Additional spatial light modulator 30' supplements this initial array of pixels by providing output pixels in a second pixel array position 46.

Referring back to FIG. 5, it is clear to one skilled in the digital image projection art that spatial light modulators 30 and 30' would have opposite polarity modulation characteristics. One of spatial light modulators 30 or 30' would modulate light having p-polarity to form a first intermediate beam; the other spatial light modulator 30 or 30' would modulate light having s-polarity to form a second intermediate beams. Polarizing beamsplitter 24 would act as an optical combiner for combining the intermediate beams to form the image-bearing beam for projection. Additional polarity conditioning components, such as waveplates, would most likely be required for implementing the enhanced resolution scheme shown in FIG. 5.

Adjustment of Image Hue

The configurations shown in FIGS. 1, 2, and 5 allow the adaptation of output color characteristics of digital display apparatus 10 to suit the brightness and hue preferences of an observer. The following allow some measure of adjustment to obtain a desired display appearance:

(a) brightness adjustment of light source 12 (FIG. 1) or of light sources 12r, 12g, 12b (FIG. 2) with intensity control 13;

(b) adjustment of $V_{bias}$ level for one or more component colors with hue control 29;

(c) configuration of variable filter 28 for attenuating one or more component colors;

(d) relative time intervals, T, for projecting each color component in each cycle 18 (FIG. 3); and (e) processing of image data by control logic processor 22, such as through a Look-Up Table (LUT).

Thus, using method (b) for example, control logic processor 22 can provide an interface that allows operator commands to modify $V_{bias}$ levels for one or more component colors. As another example, method (c) could be implemented by providing a selection of variable filters 28, differentiated by the relative amount of transmission allowed for each color component.

Method (e) could be used to separately adjust the data value that is applied for each color channel. As was noted above, diagnostic digital data is typically provided as grayscale data in monochrome form, with each pixel position having a single tone scale value. An LUT could be used to map the digital data to a corresponding data value for each color.

Various combinations of methods (a) through (e) listed above could alternately be used to achieve desired hue and brightness characteristics.

A simple operator control (not shown) could be provided to allow tuning of a suitable monochrome hue, such as by adjusting the intensity of light source 12r, 12g, or 12b or by adjusting $V_{bias}$ levels for one or more component colors. Operator control could be exercised using a mechanical device, such as a control dial, or using a touchpad or touchscreen device, as is familiar in the user interface arts. Display surface 40 could comprise a touchscreen device for obtaining operator input, for example.

Alternately, data concerning one or more of methods (a) through (e) listed above could be stored with the diagnostic digital image file itself or stored as part of a file that is coupled with the digital image data file. The parameters under which a diagnostic image has been observed can be valuable information for later analysis. For example, a doctor assessing a diagnostic image at a first location can forward the image file, with an accompanying parameters file that lists specific conditions for viewing, to another doctor at a second location. Control logic processor 22 at this second location can adjust the viewing parameters so that both doctors can confer remotely while viewing the same diagnostic image.

It may also be preferable to store parameter profiles for values used in methods (a) through (e) above. Such parameter profiles could then be applied by control logic processor 22 for use by different observers. Alternately, different parameter profiles could be applied to different image types. In this way, for example, a single digital display apparatus 10 could be employed to view multiple types of diagnostic images, including images normally displayed in monochromatic mode as well as images that display using two or more colors.

Alternate Embodiments

Figure 7:
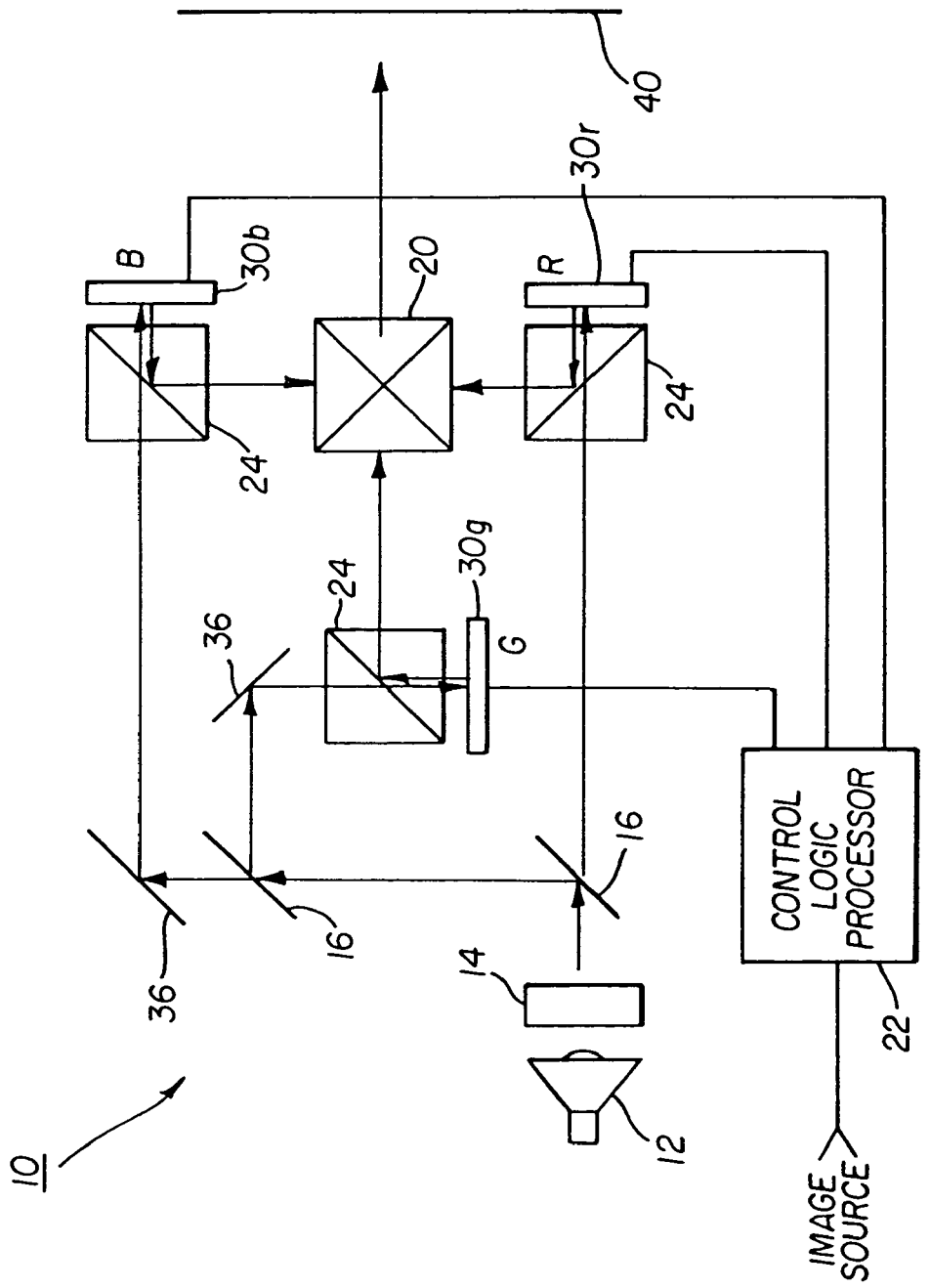
FIG. 7 shows a further alternate embodiment of the present invention in which a spatial light modulator is used for each color.
Figure 8:
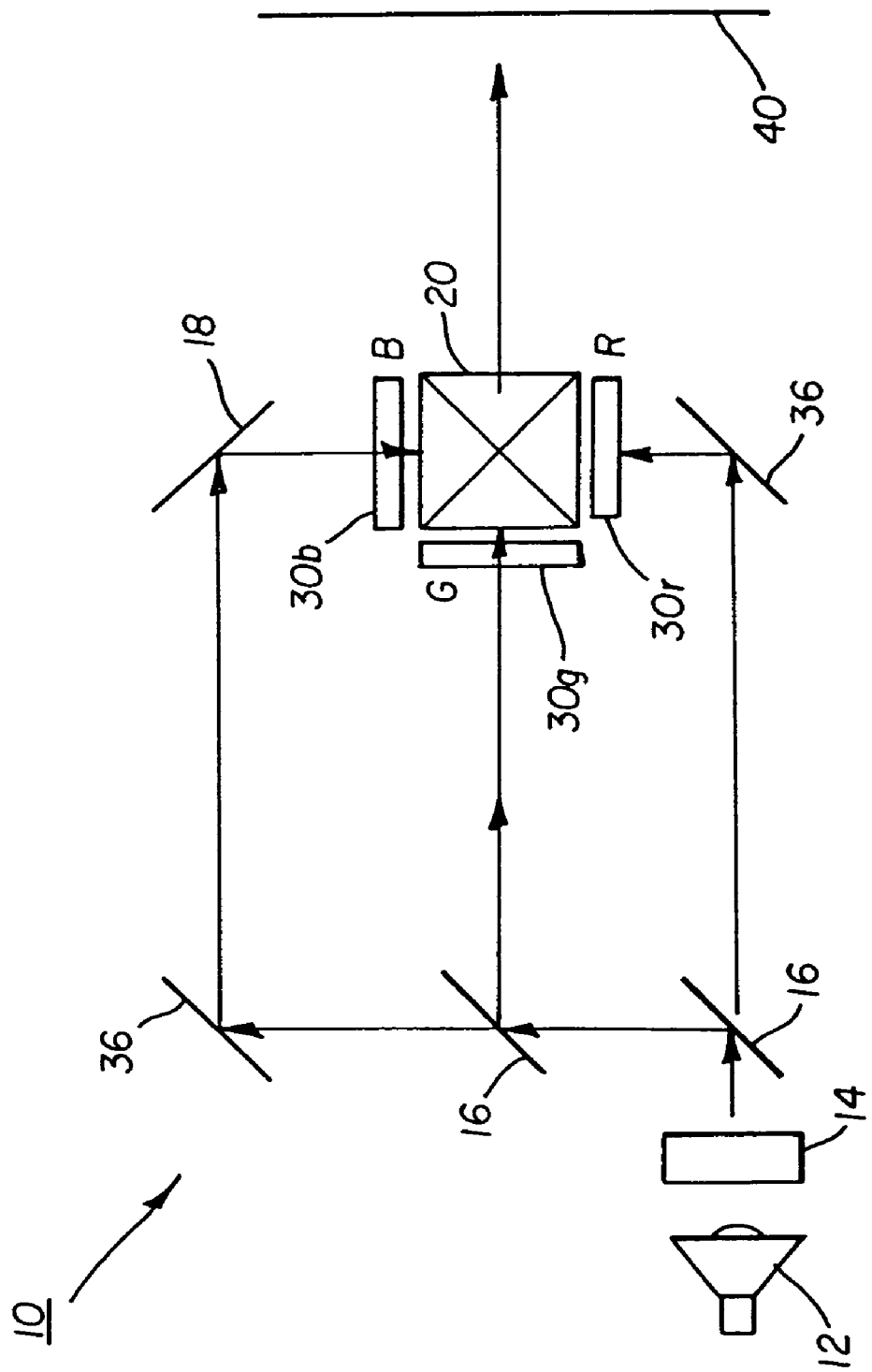
FIG. 8 is a schematic block diagram showing key components along a single color channel in an alternate embodiment of the present invention using a transmissive LCD.

FIGS. 1, 2, and 5 showed embodiments of digital display apparatus 10 using a single-channel, multiplexing red, green, and blue light for modulation in that channel. In contrast, FIGS. 7 and 8 show alternate embodiments for digital display apparatus 10 using three-channels. Referring to FIG. 7, there is shown a block diagram of key components using reflective-type LCDs as spatial light modulators 30r, 30g, and 30b. Light source 12 provides a multicolor light beam that is directed to a set of dichroic beamsplitters 16 and mirrors 36, separating the red, green, and blue component colors for distribution to their respective spatial light modulators 30r, 30g, and 30b. An X-cube 20 is used to combine the modulated red, green, and blue beams for projection to display surface 40. For simplicity, projection optics 38 are not shown. Additionally, filtering and polarization conditioning optics are also not shown in FIGS. 7 or 8.

Referring to FIG. 8, there is similarly shown a three-channel embodiment of digital display apparatus 10 using transmissive-type LCDs as spatial light modulators 30r, 30g, and 30b.

While the preferred embodiment of the present invention uses an LCD, a DMD could alternately be used. When using the DMD, it may not be necessary to use the multiplexed timing of color channels as is shown in FIG. 3. However, the color hue could not be readily adjusted as is described above when using white light only. Instead, to provide the desired monochrome hue from spatial light modulator 30, variable filter 28 could be replaced by a stationary filter that approximates the preferred color.

Variable filter 28 can be other than the rotating filter used in the preferred embodiment. Electronically switchable filters, such as filters that operate by varying optical birefringence for example, could alternately be employed.

It has been noted that it would be possible for the same basic apparatus shown in FIGS. 1, 2, 5, 7, and 8 to be used for both direct view applications and for projection applications. Using this capability, for example, one or two observers would be able to view a diagnostic image using the direct view or light-box mode. The same image could then alternately be projected onto a display screen for viewing by a larger audience. In order for a single apparatus to support both direct-view and projection modes, the following alterations could be made:

(a) brightness adjustment of light source 12;
(b) adjustment of $V_{bias}$ level for one or more component colors;
(c) mirroring of image data; and
(d) substitution of appropriate projection optics 38 components.

Light source 12 can be adjusted for brightness using intensity control 13 using conventional intensity control methods, typically by varying the drive current provided to a lamp or to LEDs, for example. Adjustments for alterations (b) and (c) above can be made by means of control software for control logic processor 22. Alteration (d) above can be implemented using conventional lens mounting apparatus, familiar to those skilled in the optical assembly arts.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

Thus, what is provided is an apparatus and method using a spatial light modulator to display a high-quality monochromatic or multicolor diagnostic image.

| PARTS LIST | |
|---|---|
| 10. | Digital display apparatus |
| 12. | Light source |
| 12r. | Red light source |
| 12g. | Green light source |
| 12b. | Blue light source |
| 13. | Intensity control |
| 14. | Uniformizing optics |
| 16. | Dichroic beamsplitter |
| 18. | Cycle |
| 20. | X-cube |
| 22. | Control logic processor |
| 23. | Image data signal |
| 24. | Beamsplitter |
| 25. | Bias voltage |
| 26. | Motor |
| 28. | Variable filter |
| 29. | Hue control |
| 30. | Spatial light modulator |
| 30r. | Red spatial light modulator |
| 30g. | Green spatial light modulator |
| 30b. | Blue spatial light modulator |
| 30'. | Additional spatial light modulator |
| 32r. | Red transmissive filter portion |
| 32g. | Green/Blue transmissive filter portion |
| 32b. | Blue transmissive filter portion |
| 36. | Mirror |
| 38. | Projection optics |
| 40. | Display surface |
| 44. | First pixel array position |
| 46. | Second pixel array position |
| 47. | Image-bearing beam |

What is claimed is:

1. A display apparatus for projection of an image-carrying beam having tone values of a single hue from color digital data onto a display surface, the apparatus comprising:
   (a) a light source for providing a beam of multicolor light, wherein said beam illuminates substantially all of said display surface;
   (b) a variable filter disposed to provide a periodic attenuation of both color and intensity of a range of component wavelengths of said beam of multicolor light in order to provide a variably tinted beam;
   (c) a spatial light modulator for modulating said variably tinted beam according to said color digital data to provide said image-carrying beam having tone values of a single hue;
   (d) a lookup table for mapping digital grayscale data with different bias voltage for each hue; and
   (e) a control logic processor for modulating said bias voltage to said spatial light modulator, said bias voltage modulation synchronous with said periodic attenuation of said variable filter such that a composite time integrated image carrying beam displays said tone values of a single hue.

2. The display apparatus of claim 1 wherein said spatial light modulator is a reflective liquid crystal device.

3. The display apparatus of claim 2 wherein said liquid crystal device is a transmissive liquid crystal device.

4. The display apparatus of claim 1 wherein said variable filter modulates birefringence.

5. The display apparatus of claim 1 wherein said display surface is a direct-view display surface.

6. The display apparatus of claim 1 wherein said display surface is a projection screen.

7. The display apparatus of claim 1 wherein said display surface is image-retentive.

8. The display apparatus of claim 6 further comprising projection optics for projection of said image-carrying beam having tone values of a single hue onto said projection screen.

9. The display apparatus of claim 5 further comprising projection optics for projection of said image-carrying beam having tone values of a single hue onto said direct-view display surface.

10. The display apparatus of claim 1 further comprising an operator control for adjusting the intensity of said light source.

11. The display apparatus of claim 1 further comprising an operator control for hue adjustment.

12. The display apparatus of claim 11 wherein said operator control conditions said bias voltage to said spatial light modulator.

13. The display apparatus of claim 11 wherein said operator control conditions the intensity of said light source.

14. The display apparatus of claim 1 wherein said variable filter is interchangeable.

15. The display apparatus of claim 1 wherein said variable filter is stationary.

16. The display apparatus of claim 1 wherein said variable filter rotates in the path of said light source.

17. The display apparatus of claim 1 wherein said variable filter is birefringent.

18. The display apparatus of claim 1 wherein said light source comprises an LED.

* * * * *